United States Patent
Murray et al.

(10) Patent No.: US 9,894,601 B2
(45) Date of Patent: Feb. 13, 2018

(54) SYSTEM AND METHOD FOR DYNAMIC WIRELESS CARRIER SWAP SYSTEM

(71) Applicant: Ford Global Technologies, LLC, Dearborn, MI (US)

(72) Inventors: Allen R. Murray, Lake Orion, MI (US); Oliver Lei, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

(21) Appl. No.: 14/828,881

(22) Filed: Aug. 18, 2015

(65) Prior Publication Data
US 2017/0055201 A1    Feb. 23, 2017

(51) Int. Cl.
*H04W 72/00* (2009.01)
*H04W 48/16* (2009.01)
*H04W 84/04* (2009.01)

(52) U.S. Cl.
CPC .......... *H04W 48/16* (2013.01); *H04W 84/042* (2013.01)

(58) Field of Classification Search
CPC ....... G07C 5/008; G07C 5/085; H04W 12/06; H04W 12/08; H04W 48/18; H04W 8/183; H04W 4/046; H04W 60/00; H04W 76/007; H04W 76/02; H04W 8/04; H04W 8/24; H04W 76/021; H04W 36/14; H04W 2209/80; H04W 2209/08; H04W 84/042; H04W 36/0016; H04W 72/00; H04W 72/0453; H04W 36/0061; H04W 72/04; H04W 36/0022; H04W 28/16; H04W 84/005; H04W 88/16; H04W 92/02; H04W 88/06; H04W 48/16; H04W 48/20; H04W 8/18; H04W 76/046; H04W 8/205; H04W 8/22; H04W 28/06; H04W 28/18; H04W 36/0011; H04W 36/0027
See application file for complete search history.

(56) References Cited

U.S. PATENT DOCUMENTS

| | | | |
|---|---|---|---|
| 7,003,319 B1 | 2/2006 | Howell et al. | |
| 2010/0261474 A1* | 10/2010 | Gollapudi, Sr. | H04W 48/18 455/435.3 |
| 2010/0279698 A1 | 11/2010 | Wong | |
| 2012/0214450 A1* | 8/2012 | Snider | H04L 67/12 455/414.1 |
| 2012/0275445 A1 | 11/2012 | Karisson | |
| 2013/0223235 A1* | 8/2013 | Hu | H04W 36/04 370/242 |
| 2014/0245003 A1* | 8/2014 | Barker | H04L 63/08 713/168 |
| 2015/0004966 A1* | 1/2015 | Ayleni | H04W 36/0005 455/433 |
| 2015/0065132 A1* | 3/2015 | Ramkumar | H04W 52/0241 455/435.3 |
| 2016/0345151 A1* | 11/2016 | Chen | H04W 48/16 |

\* cited by examiner

*Primary Examiner* — Nimesh Patel
(74) *Attorney, Agent, or Firm* — Jennifer Stec; Brooks Kushman P.C.

(57) ABSTRACT

A vehicle carrier swap system includes a controller that, in response to a notification indicating first public land mobile network (PLMN) access signal quality is less than a threshold and successful registration with a second PLMN selected from a set of PLMNs made available by at least two subscriber identity modules associated with non-roaming partner carriers according to a priority defined by the carriers, provides network access using the second PLMN.

18 Claims, 3 Drawing Sheets

SYSTEM AND METHOD FOR DYNAMIC WIRELESS CARRIER SWAP SYSTEM

TECHNICAL FIELD

The present disclosure relates to systems and methods for dynamic carrier swap.

BACKGROUND

While en route to their destination, a vehicle user, whether a driver or a passenger, may be using one or more mobile communication devices in a manner requiring a connection to a communication network. However, a paid subscription with a mobile network operator (MNO) or a wireless carrier may be required to receive network access. The mobile device may be a device such as, but not limited to, a mobile phone, tablet, laptop, wearable computer, portable media player, handheld game console, and so on. By way of a non-limiting example, the user may adopt the connection to the communication network to browse, stream an audio or a video file, play an online game, create or edit a shared digital file, and so on.

A vehicle controller having a subscription agreement with a given wireless carrier may connect the mobile device to a cellular or a wireless communication network. The wireless carrier, however, may have limited ability to provide network access in one or more geographic locations along the user's driving route due, for example, to a distance to a nearest wireless tower owned or operated by the wireless carrier. Leaving a signal range of the wireless tower owned or operated by the wireless carrier may cause a disruption in the user's network access. The disruption may be expressed among other ways in a data transmission slowdown, a rise in bit error rate (BER), and a complete network access interruption.

SUMMARY

A vehicle carrier swap system includes a controller programmed to, in response to a notification indicating first public land mobile network (PLMN) access signal quality being less than a threshold and successful registration with a second PLMN selected from a set of PLMNs made available by at least two subscriber identity modules associated with non-roaming partner carriers according to a priority defined by the carriers, provide network access using the second PLMN.

A method for swapping carriers in a vehicle includes, by a controller, in response to a notification indicating first public land mobile network (PLMN) access signal quality being less than a threshold, initiating registration with a second PLMN selected from a set of PLMNs made available by at least two subscriber identity modules associated with non-roaming partner carriers according to a priority defined by the carriers, and in response to completing the registration, providing network access using the second PLMN.

A vehicle carrier swap system includes a controller programmed to provide network access using a first public land mobile network (PLMN), in response to signal quality associated with the network access being less than a threshold, select a second PLMN from a set of PLMNs made available by at least two subscriber identity modules associated with non-roaming partner carriers, initiate registration with the second PLMN, and upon completion of the registration, provide network access using the second PLMN.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
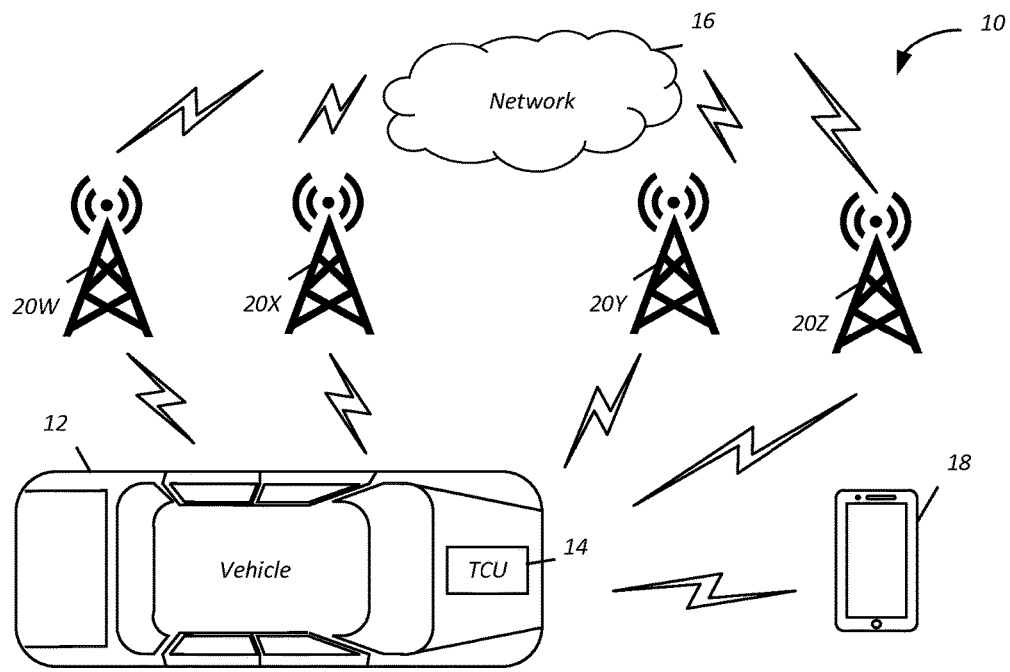
FIG. 1 is a block diagram illustrating a dynamic wireless carrier swap system.

In reference to FIG. 1, a dynamic carrier swap system 10 for a vehicle 12 is shown. The vehicle 12 includes a telematics control unit (TCU) 14, a controller programmed to connect one or more mobile devices 18 to a communication network 16. The TCU 14 and the communication network 16 may employ a variety of modulation and signaling techniques and protocols to implement data transfer between the mobile device 18 and the communication network 16. In one example, the communication network 16 may include various networks, such as Internet, packet data network (PDN), local area network (LAN), wireless local area network (WLAN), cellular radio network, and so on. The communication network 16 may be a mobile or wireless network utilizing communication standards and protocols including, but not limited to, 3rd Generation Universal Mobile Telecommunications System (3G UMTS), long term evolution (LTE), 3rd Generation Partnership Project 2 (3GPP2) and/or Worldwide Interoperability for Microwave Access (WiMAX).

While aspects disclosed herein are generally facilitated to utilize portions of the LTE, or the 4G LTE, communication standard, such implementation is non-limiting. The LTE standard based network is characterized by high-speed data transfer for mobile devices.

The TCU 14 exchanges data with the communication network 16 via network infrastructure 20, such as, but not limited to, cellular and wireless base stations. The network infrastructure 20 may include, for example, antennae, transmitters/receivers, digital signal processors, and control electronics. The network infrastructure 20 may further include a plurality of network devices (not shown), such as access switches, routers, and bridges, used for data delivery from source devices to destination devices.

A mobile network operator (MNO), hereinafter a wireless carrier, is a provider of wireless communication services that owns or controls the network infrastructure 20, the network devices, and other elements necessary to sell and deliver services to an end user including radio spectrum allocation, back haul infrastructure, billing, customer care, provisioning computer systems and marketing and repair organizations. The TCU 14 may have a service subscription contract with one or more wireless carriers to provide wireless connection between the mobile device 18 and the communication network 16. Examples of wireless carriers in the United States and Europe include, but are not limited to, Verizon Wireless™, AT&T Mobility™, T-Mobile™, Sprint™ Corporation, Telekom™, Vodafone™, Orange™, and so on.

The wireless carriers are often identified on a radio frequency (RF) channel by their assigned public land mobile network identifier (PLMN ID). The PLMN ID consists of a combination of a Mobile Country Code (MCC) and a Mobile Network Code (MNC) and each wireless carrier providing wireless communication services has its own PLMN ID. PLMNs interconnect with other PLMNs and public switched telephone networks (PSTNs) for telephone communications or with internet service providers (ISPs) for data and internet access.

Even the largest wireless carriers, despite owning or operating a large amount of network access resources, may have limited coverage in certain geographic locations. In order to expand the geographical coverage of their network the wireless carriers may seek to partner with other wireless carriers to form roaming agreements. According to these roaming agreements, the wireless carrier's roaming partner servicing geographic areas where the wireless carrier has limited presence may provide wireless network access to the wireless carrier's subscribers. The roaming partner may, therefore, provide wireless network access to the subscriber for a period of time, until, for example, the subscriber moves into a geographic location where the wireless carrier is able to provide reasonable coverage. Examples of roaming partners include, but are not limited to, Verizon Wireless™ and Sprint™ Corporation, AT&T™ and T-Mobile™, and others.

Shown in FIG. 1 are a base station 20W owned or operated by a carrier W, a base station 20X owned or operated by a carrier X, a base station 20Y owned or operated by a carrier Y, and a base station 20Z owned or operated by a carrier Z. In one example, the carriers W and X are not roaming partners, but the carriers W and Y and the carriers X and Z are roaming partners, respectively. In such an example, the TCU 14 having a service subscription contract with the carrier W may be able to connect to the communication network 16 via the base station 20Y when the vehicle 12 leaves a signal range of the base station 20W and enters a signal range of the base station 20Y. Similarly, the TCU 14 having a service subscription contract with the carrier X may be able to connect with the communication network 16 via the base station 20Z when the vehicle 12 leaves a signal range of the base station 20X and enters a signal range of the base station 20Z.

Figure 2:
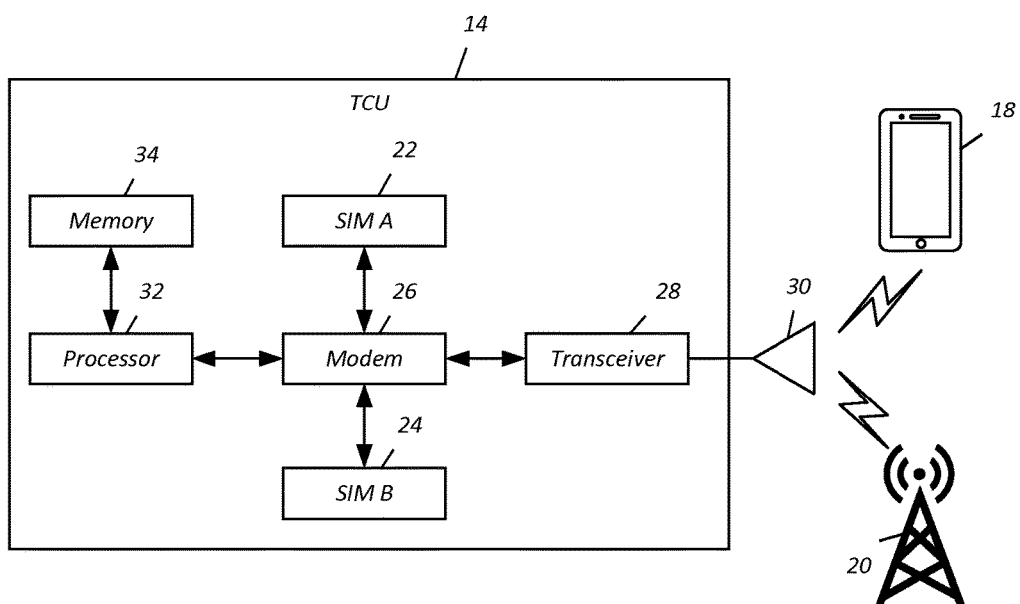
FIG. 2 is a block diagram illustrating a vehicle configured to dynamically swap wireless carriers.

In reference to FIG. 2, the TCU 14 equipped with the dynamic carrier swap system 10 is shown. The TCU 14 includes a subscriber identity module A (SIM A) 22, a SIM B 24, a modem 26, a transceiver 28, an antenna 30, a processor 32, and a memory 34. The TCU 14 may be in communication with various controllers of the vehicle 12 to provide, for example, software updates and configuration information. While an example dynamic carrier swap system 10 is shown in FIGS. 1 and 2, the example components as illustrated are not intended to be limiting. Indeed, the system 10 may have more or fewer components, and additional or alternative components and/or implementations may be used.

The SIMs A and B 22, 24 are integrated circuits intended to securely store international mobile subscriber identity (IMSI), or a subscriber identity for network access, and authenticate subscribers when the TCU 14 requests a wireless network access. The SIMs A and B 22, 24 further store information on preferred networks, such as a subscriber's home PLMN (HPLMN) and associated roaming partner networks. In one example, the SIM A 22 is issued by a carrier A and the SIM B 24 is issued by a carrier B, where the carriers A and B are not roaming partners with each other but each have roaming agreements with other wireless carriers. In such an example, the SIMs A and B 22, 24 each will store a different list of preferred PLMNs accessible by the TCU 14.

While the SIMs A and B 22, 24 are shown in FIGS. 1 and 2 as sharing the modem 26, the transceiver 28, and the antenna 30, the example implementation as illustrated is not intended to be limiting. Indeed, the SIMs A and B 22, 24 may each have a dedicated modem, transceiver, and/or antenna, and additional or alternative components and/or implementations may be used. In one example, the SIMs A and B 22, 24 may be implemented in a dual SIM dual active (DSDA) configuration, where the SIMs A and B 22, 24 each have an associated transceiver and may both be active at the same time. In another example, the SIMs A and B 22, 24 may be implemented in a dual SIM dual standby (DSDS) configuration, where the SIMs A and B 22, 24 use the same transceiver and remain in standby mode until at least one of the SIMs 22, 24 becomes active, at which point signals directed to the other SIM will be ignored.

The TCU 14 further includes the modem 26, a controller programmed to establish a wireless connection between the mobile device 18 and the communication network 16. The modem 26 is configured to determine a quality of the wireless connection between the mobile device 18 and the communication network 16. For example, the modem 26 may be configured to detect signal strength of the wireless signal broadcasted by a PLMN to which it is currently connected. In another example, the modem 26 may be configured to detect data rate of the wireless data transmission provided by the PLMN to which it is currently connected. The modem 26 may be configured to dynamically switch from a current PLMN to another PLMN in response to the signal strength of the current PLMN being less than a predetermined threshold. The modem 26 may be further configured to dynamically switch from a current PLMN to another PLMN in response to the data rate of the current PLMN being less than a predetermined threshold.

The modem 26 is further configured to receive a list of preferred PLMNs stored in each of the SIMs A and B 22, 24. In one example, the lists of preferred PLMNs may be based on service subscription contracts with the wireless carriers A and B which issued the SIMs A and B 22, 24, respectively, where the wireless carriers A and B are not roaming partners with each other.

The modem 26 is further configured to analyze available PLMNs. For example, in response to a request from the modem 26, the transceiver 28 in cooperation with the antenna 30 may scan all RF channels seeking for a strongest cell according to a predetermined cell searching procedure. The modem 26 may then read system information for the identified strongest cell in order to find out which PLMN the cell belongs to. In one example, the modem 26 may analyze the MCC and the associated MNC of each of the available PLMNs to determine their PLMN ID. In another example, the modem 26 may compare a list of the available PLMNs to the lists of preferred PLMNs based on service subscription contracts with the wireless carriers A and B, where the wireless carriers A and B are not roaming partners.

The modem 26 is configured to sort the available PLMNs in a predetermined descending order of priority. In one example, the modem 26 may prioritize a home PLMN (HPLMN) as having the highest priority and an equivalent HPLMN (EHPLMN) as having the second highest priority after the HPLMN. The modem 26 may prioritize a registered PLMN (RPLMN) as having a third highest priority after the HPLMN and the EHPLMN and a visited PLMN (VPLMN) as having a fourth highest priority. The modem 26 may be configured to prioritize an operator PLMN (OPLMN) as having the fifth highest priority.

In one example, the modem 26 may select another PLMN from a sorted list of available PLMNs in response to detecting that at least one of signal strength and data rate of the current PLMN is below a first and a second predetermined threshold, respectively. The modem 26 may, for example, be configured to select another PLMN using automatic mode, such as selecting from a list of available PLMNs a PLMN having the highest priority. The modem 26 may be further configured to select another PLMN using a manual mode, such as providing a mobile device user with a list of available PLMNs and, in response to the user's manual selection on a mobile device HMI, initiate a registration process with the selected PLMN.

The modem 26 may be further configured to, prior to initiating a registration process with the next available PLMN having the highest priority, determine its signal strength, e.g., reference signal receive power (RSRP), or an average power received by resource elements (RE) that carry cell-specific reference signals (RS) over the entire bandwidth of the wireless signal. The modem 26 may initiate a registration process with the next available PLMN having the highest priority in response to determining that its signal strength exceeds a predetermined threshold, e.g., RSRP is greater than −90 Decibel-milliwatts (dBm) or another predetermined value. In one example, the registration process is successful if the modem 26 identified a suitable cell of a given PLMN to camp on and a location registration (LR) request from the modem 26 has been accepted in a registration area of the cell on which the modem 26 is camped. The modem 26 may provide the mobile device 18 wireless access to the communication network 16 in response to determining that the registration process has been successfully completed.

The modem 26 may be further configured to determine a next available PLMN having the highest priority in response to determining that the registration process has not been successfully completed. In one example, the modem 26 may select a next available PLMN having the highest priority from a list of available PLMNs arranged in a predetermined descending order of priority to which it has not yet tried to connect to. The modem 26 may further base the selection of the next available PLMN having the highest priority on whether a signal strength of that PLMN exceeds a predetermined threshold. The modem 26 may provide the mobile device 18 wireless access to the communication network 16 in response to determining that the registration process to a suitable cell of the PLMN has been successfully completed.

The TCU 14 may include one or more processor 32 configured to perform instructions, commands and other routines in support of the processes described herein. For instance, the processor 32 may be configured to execute instructions of the modem 26 to provide the mobile device 18 wireless access to the communication network 16. Such instructions of the modem 26 and other data may be maintained in a non-volatile manner using a variety of types of computer-readable storage medium. A computer-readable medium (also referred to as a processor-readable medium or storage) includes any non-transitory medium (e.g., a tangible medium) that participates in providing instructions or other data that may be read by the processor 32 of the TCU 14. Computer-executable instructions may be compiled or interpreted from computer programs created using a variety of programming languages and/or technologies, including, without limitation, and either alone or in combination, Java, C, C++, C#, Objective C, Fortran, Pascal, Java, Java Script, Python, Perl, and PL/SQL.

The processor 32 may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein, such as, but not limited to, a system functionality check. A general purpose processor may be a microprocessor, but in the alternative, the processor may be any conventional processor, controller, microcontroller, or state machine. The processor 32 may also be implemented as a combination of computing devices, e.g., a combination of a DSP and a microprocessor, a plurality of microprocessors, one or more microprocessors in conjunction with a DSP core, or any other such configuration.

The memory 34 may be connected with the processor 32 or embedded as part of the processor 32. The memory 34 may be used for storing the various information or data used in the determinative or selective processes, as discussed in greater detail below. The memory 34 may also be used for storing instructions for an available PLMN detection, a PLMN sorting, a PLMN selection, and a PLMN registration processes. The memory 34 can be both persistent and non-persistent. The memory 34 can include random access memory (RAM), such as but not limited to, DRAM, SRAM, T-RAM, Z-RAM, TTRAM, etc. The memory 34 may also include read only memory, such as but not limited to, PROM, EPROM, EEPROM, etc.

Figure 3:
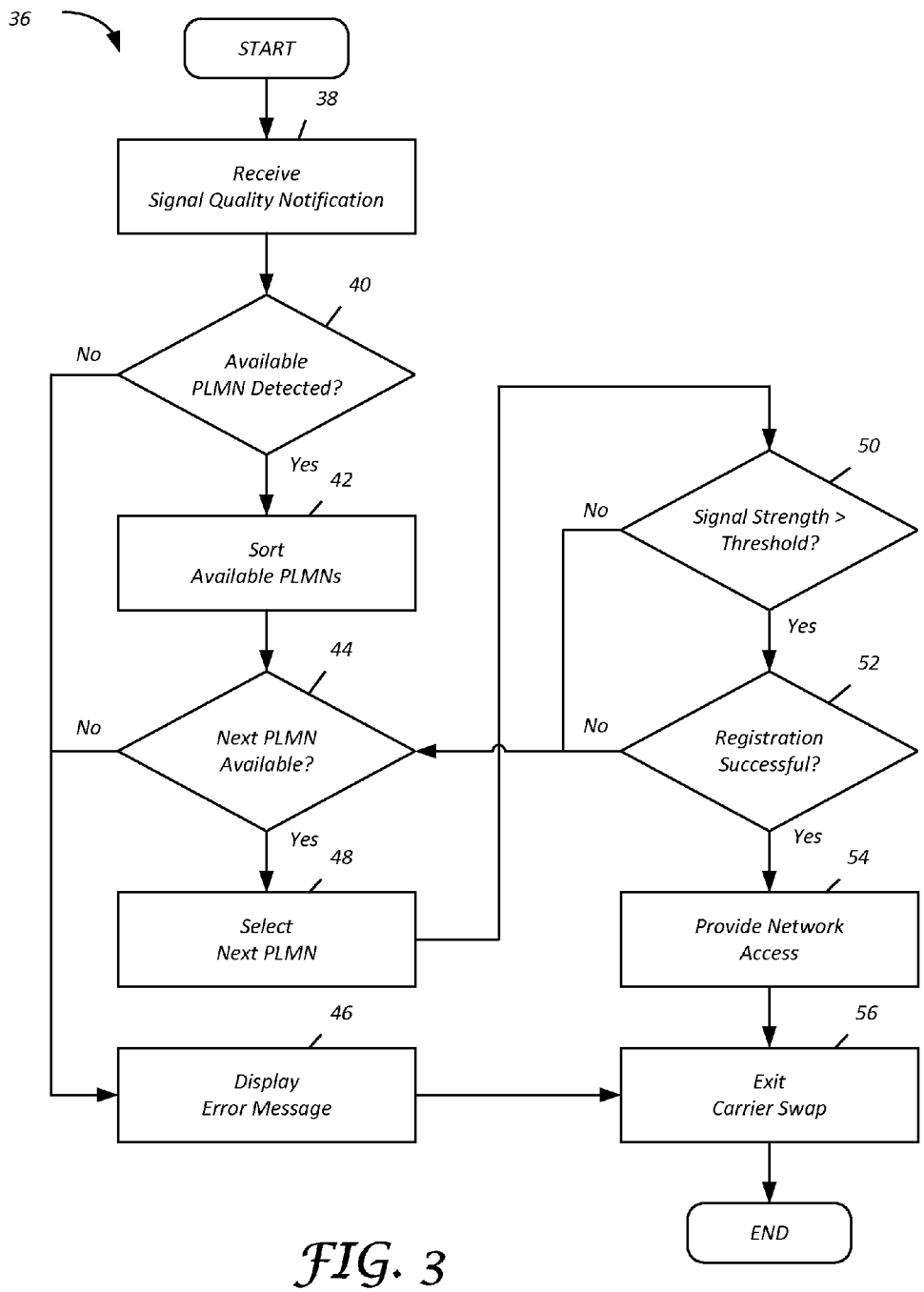
FIG. 3 is a flowchart illustrating an algorithm for performing a dynamic wireless carrier swap.

In reference to FIG. 3, a control strategy 36 for performing an automatic dynamic carrier swap is shown. The control strategy 36 may begin at block 38 where the modem 26 receives a notification indicative of signal quality being below a predetermined threshold. In one example, the processor 32 may determine that quality of a wireless connection is lower than a predetermined threshold by detecting that at least one of signal strength and data rate of the wireless signal is below a predetermined threshold. At block 40 the modem 26 determines whether there are any PLMNs within signal range of the geographic location of the vehicle 12. For example, the modem 26 may determine whether one or more of HPLMN, EHPLMN, RPLMN, VPLMN, and OPLMN are within signal range. The modem 26 displays an error message at block 46, in response to determining that no PLMNs are within signal range of the vehicle 12. The modem 26 may then exit the dynamic carrier swap session at block 56.

At block 42 the modem 26 sorts the available PLMNs. For example, the modem 26 may arrange the available PLMNs in the order of descending priority, such as, but not limited to, HPLMN, EHPLMN, RPLMN, VPLMN, and OPLMN.

The modem 26 determines whether a set of sorted PLMNs has a next PLMN available for a connection. For example, the modem 26 may analyze the sorted set of the available PLMNs to locate an available PLMN to which it has not yet tried to connect to during a given carrier swap session. The modem 26 displays an error message at block 46, in response to determining that the sorted set of the available PLMNs does not have a next PLMN available for a connection, e.g., the modem 26 determines that the sorted set of the available PLMNs has no available PLMN to which it has not yet tried to connect to. The modem 26 may then exit the dynamic carrier swap session at block 56.

The modem 26 at block 48 selects the next available PLMN, e.g., the available PLMN to which it has not yet tried to connect to during a given carrier swap session. At block 50 the modem 26 determines whether signal strength of the selected PLMN is greater than a predetermined threshold. The modem 26 returns to block 44 and determines whether the set of sorted PLMNs has a next PLMN available for a connection, in response to determining that signal strength of the selected PLMN is less than a predetermined threshold.

In response to determining that signal strength of the selected PLMN is greater than a predetermined threshold, the modem 26 determines at block 52 whether an attempted registration to the selected PLMN was successful. The modem 26 returns to block 44 and determines whether the set of sorted PLMNs has a next PLMN available for a connection, in response to the attempted registration to the selected PLMN not being successful. For example, the modem 26 may determine that authentication failed when attempting to connect to the selected PLMN.

At block 54 the modem 26 provides network access to the mobile device 18, in response to determining the attempted registration to the selected PLMN was successful. The modem 26 exits the dynamic carrier swap session at block 56. At this point the control strategy 36 may end. In some embodiments, the control strategy 36 described in FIG. 3 may be repeated in response to receiving a poor connection notification or in response to receiving another notification.

Figure 4:
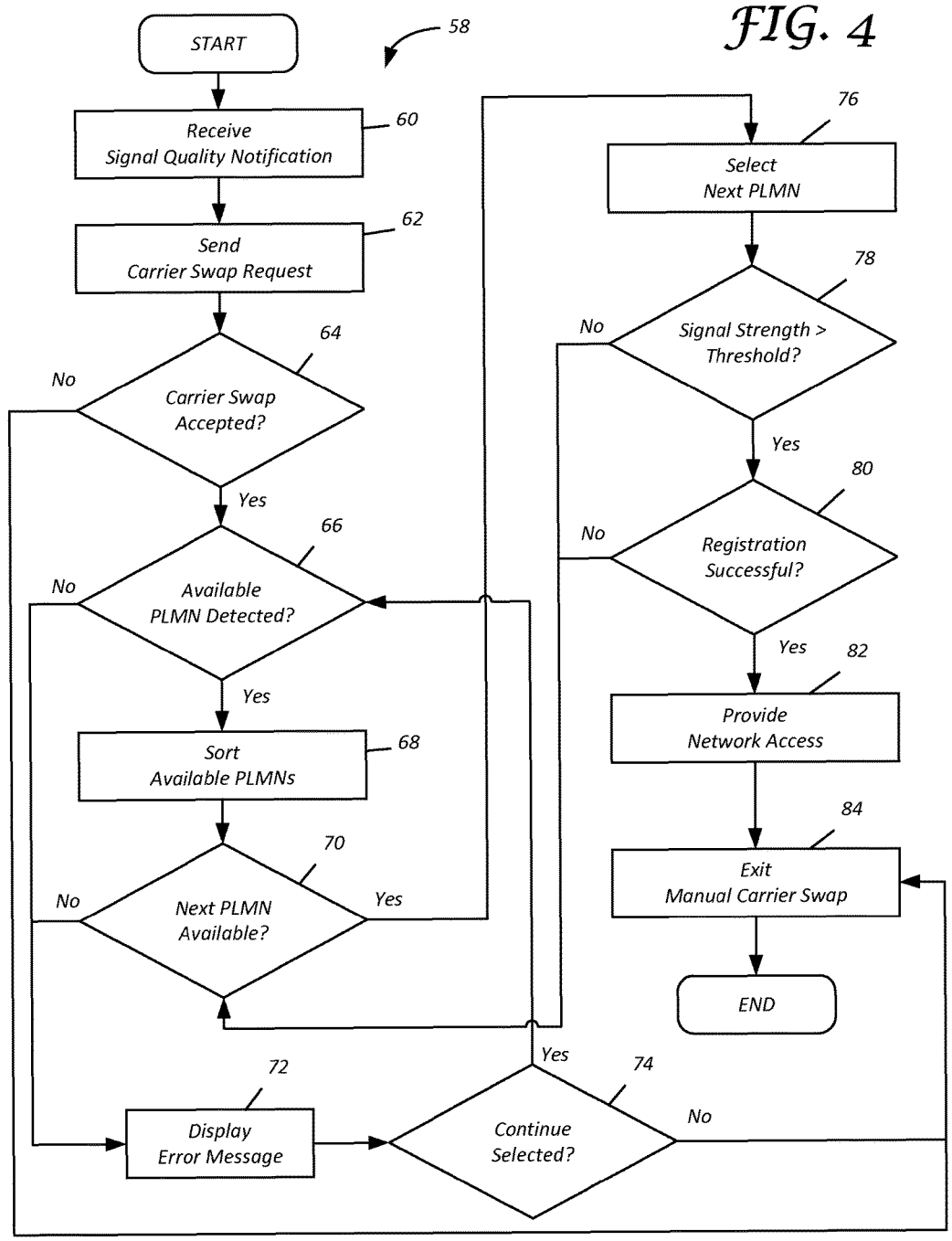
FIG. 4 is a flowchart illustrating an algorithm for performing a dynamic wireless carrier swap using a human machine interface (HMI) of a mobile device.

In reference to FIG. 4, a control strategy 58 for performing a manual dynamic carrier swap is shown. The control strategy 58 begins at block 60 where the modem 26 receives a notification indicative of signal quality being below a predetermined threshold. In one example, the processor 32 may determine that quality of a wireless connection is lower than a predetermined threshold by detecting that at least one of signal strength and data rate of the wireless signal is below a predetermined threshold. The modem 26 at block 62 sends a carrier swap request to the mobile device 18.

At block 64 the modem 26 determines whether the request to swap carriers has been accepted. For example, the mobile device 18 may display a carrier swap request on the mobile device screen requesting the user to select input "yes" to accept a carrier swap and "no" to decline a carrier swap. In such an example, the mobile device 18 may notify the modem 26 that the request to swap carriers has been accepted if the user selects input "yes". The mobile device 18 may notify the modem 26 that the request to swap carriers has been declined if the user selects input "no." The modem 26 exits the manual carrier swap block 84, in response to receiving a notification that the request to swap carriers has been declined.

At block 66 the modem 26 determines whether there are any PLMNs within signal range of geographic location of the vehicle 12, in response to receiving a notification that the request to swap carriers has been accepted. For example, the modem 26 may determine whether one or more of HPLMN, EHPLMN, RPLMN, VPLMN, and OPLMN are within signal range. The modem 26 displays an error message at block 72, in response to determining that no PLMNs are within signal range of the vehicle 12.

The modem 26 may then determine at block 74 whether a request to continue carrier swap session has been accepted. For example, the mobile device 18 may display a carrier swap request on the mobile device screen requesting the user to select input "yes" to accept to continue a carrier swap and "no" to decline to continue a carrier swap. In such an example, the mobile device 18 may notify the modem 26 that the request to continue carrier swap session has been accepted if the user selects input "yes". The mobile device 18 may notify the modem 26 that the request to continue carrier swap has been declined if the user selects input "no." The modem 26 exits the manual carrier swap at block 84, in response to receiving a notification that the request to continue carrier swap has been declined. In response to receiving a notification that the request to continue carrier swap has been accepted, the modem 26 returns to block 66 and determines whether there are any PLMNs within signal range of geographic location of the vehicle 12.

At block 68 the modem 26 sorts the available PLMNs, in response to determining at block 88 that there is at least one PLMN within signal range of the vehicle geographic location. For example, the modem 26 may arrange the available PLMNs in the order of descending priority, such as, but not limited to, HPLMN, EHPLMN, RPLMN, VPLMN, and OPLMN. The modem 26 determines at block 70 whether a set of sorted PLMNs has a next PLMN available for a connection. For example, the modem 26 may analyze the sorted set of the available PLMNs to locate an available PLMN to which it has not yet tried to connect to during a given carrier swap session. The modem 26 displays an error message at block 72, in response to determining that the sorted set of the available PLMNs does not have a next PLMN available for a connection, e.g., the modem 26 determines that the sorted set of the available PLMNs has no available PLMN to which it has not yet tried to connect to.

In response to determining that the sorted set of the available PLMNs has a next PLMN available for a connection, the modem 26 at block 76 selects the next available PLMN, e.g., the available PLMN to which it has not yet tried to connect to during a given carrier swap session. At block 78 the modem 26 determines whether signal strength of the selected PLMN is greater than a predetermined threshold. The modem 26 returns to block 70 and determines whether the set of sorted PLMNs has a next PLMN available for a connection, in response to determining that signal strength of the selected PLMN is less than a predetermined threshold.

In response to determining that signal strength of the selected PLMN is greater than a predetermined threshold, the modem 26 determines at block 80 whether an attempted registration to the selected PLMN was successful. The modem 26 returns to block 70 and determines whether the set of sorted PLMNs has a next PLMN available for a connection, in response to the attempted registration to the selected PLMN not being successful, e.g., an authentication process failed when attempting to connect to the selected PLMN.

At block 82 the modem 26 provides network access to the mobile device 18, in response to determining the attempted registration to the selected PLMN was successful. The modem 26 exits the dynamic carrier swap session at block 84. At this point the control strategy 58 may end. In some embodiments, the control strategy 58 described in FIG. 4 may be repeated in response to receiving a poor connection notification or in response to receiving another notification.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications

What is claimed is:

1. A vehicle system, comprising:
    a controller in communication with at least two subscriber identity modules (SIMs), each of the SIMs providing network access via one of a plurality of preferred public land mobile networks (PLMNs) defined by a carrier associated with the SIM, wherein the carriers are not roaming partners with one another such that the preferred PLMNs defined by a first carrier are different from the preferred PLMNs defined by a second carrier, the controller programmed to,
        in response to detecting that signal quality of a connection to a first PLMN that is one of the preferred PLMNs of the first carrier is less than a threshold, connect to a second PLMN that is one of the preferred PLMNs of the second carrier selected from a list that combines the PLMNs of the SIMs.

2. The system of claim 1, wherein the signal quality is defined by at least one of a signal strength or a data rate.

3. The system of claim 2, wherein the signal strength is based on a reference signal received power (RSRP).

4. The system of claim 1, wherein the second PLMN is further selected based on an availability of the second PLMN as defined by a radio frequency (RF) channel scan.

5. The system of claim 1, wherein the plurality of preferred PLMNs corresponding to each of the SIMs are arranged in descending order of priority as a home PLMN (HPLMN), an equivalent HPLMN (EHPLMN), a registered PLMN (RPLMN), a visited PLMN (VPLMN), and an operator PLMN (OPLMN).

6. The system of claim 1, wherein the SIMS are arranged in a dual SIM dual standby (DSDS) configuration.

7. The system of claim 1, wherein the SIMS are arranged in a dual SIM dual active (DSDA) configuration.

8. The system of claim 1, wherein, prior to connecting to the second PLMN, the controller is further programmed to request a user approval of the connection.

9. The system of claim 1, wherein the second PLMN is further selected manually by a user of the vehicle.

10. A method for a vehicle, comprising:
    responsive to detecting, by a controller, signal quality of a first public land mobile network (PLMN) connection less than a threshold, connecting to a second PLMN selected from a prioritized list combining preferred PLMNs of at least two subscriber identity modules (SIMs), wherein the respective preferred PLMNs are different as defined by carriers that are not roaming partners with one another, and providing network access using the second PLMN.

11. The method of claim 10, wherein the signal quality is defined by at least one of a signal strength or a data rate.

12. The method of claim 11, wherein the signal strength is based on a reference signal received power (RSRP).

13. The method of claim 10, wherein the second PLMN is further selected based on an availability of the second PLMN as defined by a radio frequency (RF) channel scan.

14. The method of claim 10, wherein the prioritized list includes arranging the PLMNs in descending order of priority as a home PLMN (HPLMN), an equivalent HPLMN (EHPLMN), a registered PLMN (RPLMN), a visited PLMN (VPLMN), and an operator PLMN (OPLMN).

15. The method of claim 10, wherein the SIMs are arranged in a dual SIM dual standby (DSDS) configuration.

16. The method of claim 10, wherein the SIMs are arranged in a dual SIM dual active (DSDA) configuration.

17. A vehicle carrier swap system, comprising:
    a controller connected to at least two subscriber identity modules (SIMs), each of the SIMs providing network access using one of a plurality of preferred public land mobile networks (PLMNs) defined by a carrier of the SIM, wherein the carriers are not roaming partners with one another such that the respective preferred PLMNs are different from each other, the controller programmed to,
        in response to detecting that signal quality of a current network connection to a first PLMN is less than a threshold, select a second PLMN from a prioritized list that combines the respective preferred PLMNs of the SIMs, wherein the first PLMN is one of the PLMNs of a first carrier and the second PLMN is one of the PLMNs of a second carrier,
        initiate registration with the second PLMN, and
        upon registration, connect to the second PLMN.

18. The system of claim 17, wherein the list of PLMNs is a set of available PLMNs defined by a radio frequency (RF) channel scan and prioritized in descending order of priority defined by the carriers.

* * * * *